(12) United States Patent
Luker

(10) Patent No.: US 12,301,653 B2
(45) Date of Patent: *May 13, 2025

(54) DYNAMIC EXECUTION RESOURCE SELECTION FOR CUSTOMIZED WORKFLOW TASKS

(71) Applicant: Amazon Technologies, Inc., Seattle, WA (US)

(72) Inventor: Matthew Luker, Port Angeles, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,270

(22) Filed: Apr. 7, 2023

(65) Prior Publication Data

US 2023/0247090 A1  Aug. 3, 2023

Related U.S. Application Data

(63) Continuation of application No. 17/333,731, filed on May 28, 2021, now Pat. No. 11,627,180, which is a continuation of application No. 15/628,504, filed on Jun. 20, 2017, now Pat. No. 11,025,707.

(51) Int. Cl.
*H04L 67/1004* (2022.01)
*H04L 67/10* (2022.01)
*H04L 41/0823* (2022.01)
*H04L 67/1001* (2022.01)

(52) U.S. Cl.
CPC .......... *H04L 67/1004* (2013.01); *H04L 67/10* (2013.01); *H04L 41/0823* (2013.01); *H04L 67/1001* (2022.05)

(58) Field of Classification Search
CPC . H04L 67/1004; H04L 67/10; H04L 41/0823; H04L 67/1001; H04L 41/0246; H04L 41/0273; H04L 41/5019; H04L 41/5051; H04L 41/5054; H04L 41/5064; H04L 43/0811; H04L 67/1023
See application file for complete search history.

(56) References Cited

U.S. PATENT DOCUMENTS

| | | |
|---|---|---|
| 6,349,238 B1 | 2/2002 | Gabbita et al. |
| 6,463,346 B1 | 10/2002 | Flockhart et al. |
| 7,062,537 B2 | 6/2006 | Aziz et al. |
| 7,240,324 B2 | 7/2007 | Casati et al. |
| 7,330,832 B1 | 2/2008 | Gray et al. |

(Continued)

OTHER PUBLICATIONS

Amazon Web Services, "AWS Greengrass," downloaded from https://aws.amazon.com/greengrass/ on Jun. 2, 2017, pp. 1-10.

(Continued)

*Primary Examiner* — Michael Won
(74) *Attorney, Agent, or Firm* — S. Scott Foster; Kowert, Hood, Munyon, Rankin & Goetzel, P.C.

(57) ABSTRACT

A representation of a workflow comprising a plurality of tasks is obtained. An execution of an instance of the workflow is initiated. The execution comprises selecting, with respect to a particular task of the workflow, a particular execution resource option from a set comprising at least a first execution resource option and a second resource execution option. A result of the execution is stored.

20 Claims, 10 Drawing Sheets

(56) References Cited

U.S. PATENT DOCUMENTS

| | | | |
|---|---|---|---|
| 7,403,948 B2 * | 7/2008 | Ghoneimy | G06Q 10/10 |
| | | | 707/999.009 |
| 7,467,371 B1 | 12/2008 | Meredith et al. | |
| 8,341,590 B1 * | 12/2012 | Poole | G06F 8/71 |
| | | | 717/121 |
| 9,369,390 B2 * | 6/2016 | Bantukul | H04L 41/0896 |
| 10,108,593 B2 * | 10/2018 | Mauceri, Jr. | G06F 8/30 |
| 10,585,698 B2 | 3/2020 | Gerber et al. | |
| 11,082,486 B1 * | 8/2021 | Brevoort | H04L 65/1083 |
| 11,297,121 B2 | 4/2022 | Sodagar | |
| 11,340,939 B1 | 5/2022 | Barker, Jr. et al. | |
| 11,627,180 B2 | 4/2023 | Luker | |
| 2002/0188597 A1 | 12/2002 | Kern et al. | |
| 2003/0061090 A1 | 3/2003 | Marano | |
| 2003/0078798 A1 | 4/2003 | Zaks et al. | |
| 2003/0217053 A1 | 11/2003 | Bachman et al. | |
| 2004/0078778 A1 | 4/2004 | Leymann et al. | |
| 2006/0080389 A1 | 4/2006 | Powers et al. | |
| 2006/0224432 A1 | 10/2006 | Li | |
| 2007/0179829 A1 | 8/2007 | Laperi et al. | |
| 2009/0089078 A1 | 4/2009 | Bursey | |
| 2009/0094075 A1 | 4/2009 | Parisien et al. | |
| 2009/0172668 A1 | 7/2009 | Bobak et al. | |
| 2009/0241117 A1 | 9/2009 | Dasgupta et al. | |
| 2009/0281777 A1 | 11/2009 | Baeuerle et al. | |
| 2009/0300210 A1 | 12/2009 | Ferris | |
| 2012/0066062 A1 | 3/2012 | Yoder et al. | |
| 2012/0079409 A1 | 3/2012 | Luo et al. | |
| 2012/0124194 A1 | 5/2012 | Shouraboura | |
| 2014/0019187 A1 * | 1/2014 | Olsen | G06Q 50/01 |
| | | | 705/7.23 |
| 2014/0026182 A1 * | 1/2014 | Pearl | H04L 63/20 |
| | | | 726/1 |
| 2014/0081689 A1 | 3/2014 | Steiner et al. | |
| 2016/0004565 A1 | 1/2016 | Harper et al. | |
| 2016/0094483 A1 | 3/2016 | Johnston et al. | |
| 2016/0232491 A1 * | 8/2016 | Nalsky | G06F 16/2282 |
| 2017/0031565 A1 * | 2/2017 | Chauhan | H04L 63/1425 |
| 2018/0024851 A1 | 1/2018 | Barker et al. | |
| 2018/0024861 A1 | 1/2018 | Balle et al. | |
| 2018/0060930 A1 | 3/2018 | Kordonowy et al. | |
| 2018/0157384 A1 | 7/2018 | Baneva et al. | |
| 2019/0019130 A1 * | 1/2019 | Gentilhomme | G06Q 10/06316 |
| 2019/0394251 A1 * | 12/2019 | Mehta | H04L 67/02 |

OTHER PUBLICATIONS

Amazon Web Services, "AWS Lambda: Developer Guide," downloaded May 29, 2017, pp. 1-459.

Amazon Web Services, "Amazon Simple Workflow Service: Developer Guide," API Version Jan. 25, 2012, pp. 1-193.

* cited by examiner

```
[
    {
        mapping:{
            class: "cust1.testmapping",
            client: "4624ED79",
            productLine: "PL1",
            actionType: "AType1"
        },
        workflow: {
            version: 1.0,
            identifier: "wf00001",
            field1: "value1",
            class: "process.owner.wfimpl1",
            tasks: [
                {
                    class: "process.owner.custcheck",
                    id: "custCheck"
                    customerType: "client"
                },
                {
                    id: "client-task-set1",
                    deployableDistributionUrl: "https:<url1>",
                    DynamicProvComputingSvc1: {
                        materialSetName: "abcSet",
                        functionName: "customTask1"
                    }
                },
                {
                    class: "process.owner.offervalidation",
                    id: "oValidation"
                }
            ]
        }
    }
]
```

Workflow specification/ descriptor 802

*FIG. 8*

DYNAMIC EXECUTION RESOURCE SELECTION FOR CUSTOMIZED WORKFLOW TASKS

This application is a continuation of U.S. patent application Ser. No. 17/333,731, filed May 28, 2021, which is a continuation of U.S. patent application Ser. No. 15/628,504 filed Jun. 20, 2017, now U.S. Pat. No. 11,025,707, which are hereby incorporated by reference herein in their entirety.

BACKGROUND

Network-accessible services and systems have become widely available in recent years. Network-accessible services may for example provide a variety of computing resources (e.g., virtual machines, physical machines, software containers etc.), devices configured to provide storage resources (e.g., virtual storage devices, database instances, etc.), support for various types of networking algorithms and protocols, and so on.

Many applications which were previously run on customer premises have been migrated to network-accessible services environments such as public cloud environments. Some applications may utilize a combination of service resources for complex workflows, with resources of different types being potentially physically dispersed and managed by logically separate service managers. A given application workflow may, for example, comprise numerous individual tasks, with the successful completion of a given task using one set of resources representing a pre-requisite for the initiation of a subsequent task (which may in turn use a different set of resources). Depending on the manner in which the tasks are designed and implemented, a given workflow task may itself consume resources of a plurality of services.

Clients on whose behalf application workflows are to be run using a network-accessible service may sometimes have customer-specific requirements for at least some of the workflow tasks. For example, some customers may prefer that a workflow task which deals with sensitive data be processed at resources selected by the customer rather than at resources selected by a workflow management service. At the same time, the service which is responsible for implementing instances of the application workflows on behalf of numerous users may have to ensure that the specifications associated with the workflows are not violated, and that the appropriate set of resources is deployed for a given workflow instance to meet the needs of the customer and the objectives of the service itself. Orchestrating the design and implementation of complex workflows on behalf of large numbers of customers with potentially divergent requirements may represent a non-trivial technical challenge.

BRIEF DESCRIPTION OF DRAWINGS

FIG. 8 illustrates an example portion of a workflow specification, according to at least some embodiments.

Figure 1:
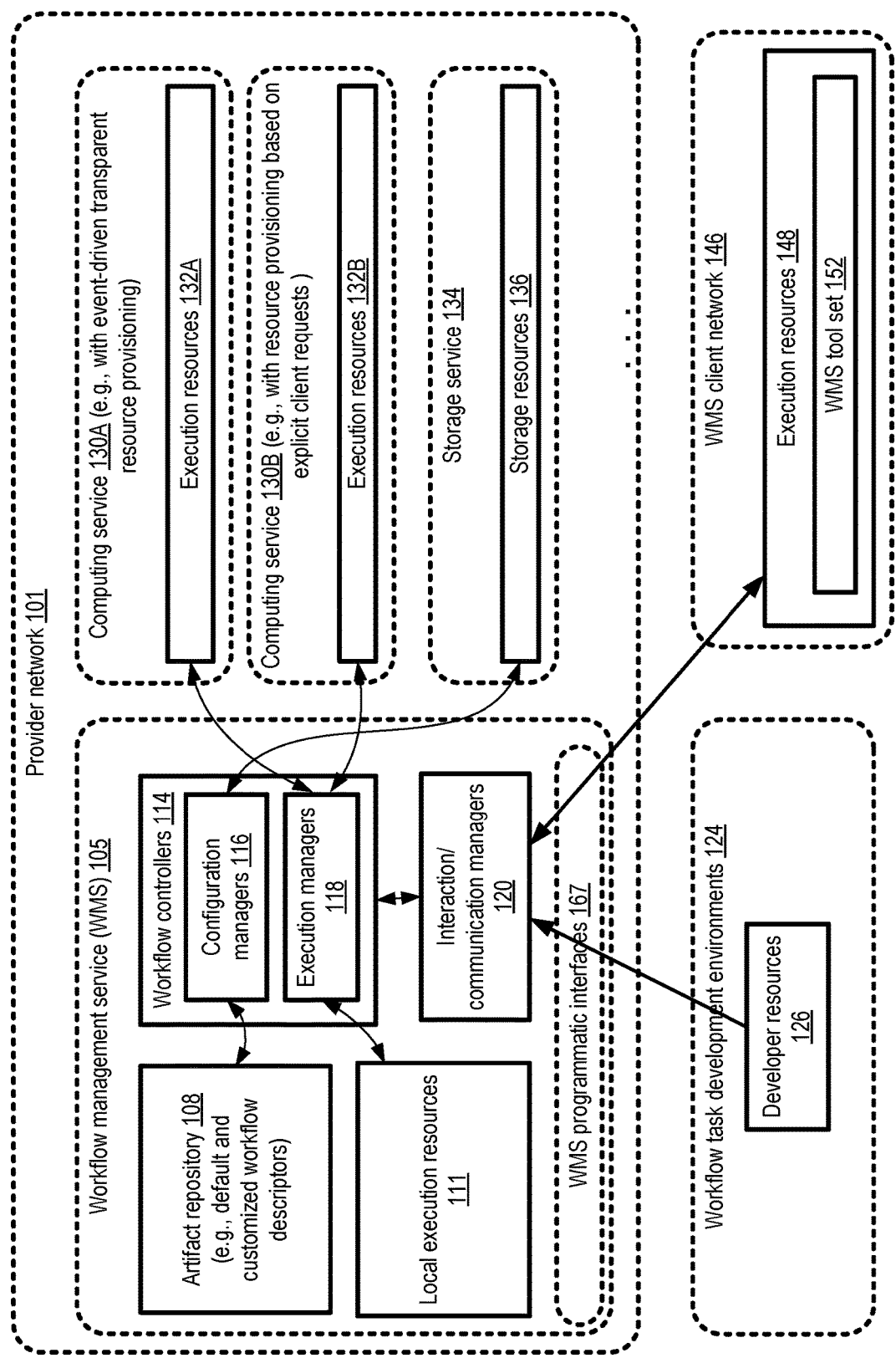
FIG. 1 illustrates an example system environment in which a workflow management service which support customized dynamic selection of execution platforms for workflow tasks may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for supporting the development and execution of customizable workflows with dynamically selected execution platforms for individual tasks are described. According to one embodiment, a system may comprise one or more workflow controllers of a network-accessible workflow management service (WMS). A given workflow controller may be implemented at one or more computing devices. At a high level, the workflow management service may, among other functions, store default and customized versions of workflows in various embodiments, with each workflow comprising some number of individual tasks which can be scheduled independently of one another on a variety of execution platforms. In response to triggering events, such as the determination that a web-services request associated with an application has been received, a workflow controller may identify the appropriate version (e.g., a default or customized version) of a workflow which is to be initiated, choose from among one or more execution platform options for various tasks of the workflow, cause the tasks of an instance of the workflow to be executed at the selected platforms, and verify that the results or output of the workflow instance meets the specified requirements of the workflow. A number of programmatic interfaces may be supported by the WMS in different embodiments, including interfaces which can be used by task developers to submit software code corresponding to default and/or custom workflow tasks, interfaces which can be used to establish service agreements with WMS customers or clients, and so on. It is noted that in various embodiments the term workflow may broadly refer to operations that comprise a set of steps (some of which may potentially be performed in parallel with one another), where at least some of the steps may be triggered by respective state changes such as the completions of earlier steps or the availability of specified input. The techniques for customization and dynamic selection of execution platforms described herein may thus be applied to operations of state machines in at least some embodiments. Generally speaking, designation of a set of operations as a workflow, or the use of the term "workflow", is not a requirement for the successful use of the techniques described herein.

According to at least some embodiments, a workflow controller of the WMS may transmit or provide, to a client of the WMS, a descriptor of a first workflow. The descriptor may indicate, among other aspects or properties of the first workflow, at least a workflow output or result requirement/specification and respective baseline versions of one or more tasks. Subsequently, the workflow controller may receive, from the client, a representation of a first customization of the first workflow. A number of different types of customizations may be possible in different embodiments, such as the addition of one or more customized tasks, the substitution of a default task with a customized task, and so on, as discussed below in further detail. With respect to a particular customized or default task of the first workflow, several different execution platforms or resources may potentially be used in at least some embodiments. In at least one embodiment, the set of possible execution platforms associated with a task may be indicated in the customized version, e.g., either by providing a list of permitted execution options or by providing a list of execution options which are not allowed for the task. In some embodiments, the set of execution platforms associated with a given task may include resources of a dynamically-provisioned computing service of a provider network or public cloud environment. At such a computing service, instead of pre-allocating resources on behalf of a particular customer or client, resources may be selected at run-time in response to a determination that a particular task or operation is to be performed. Other execution resource options for tasks may include the use of one or more processes at a host of the workflow management service itself, other computing services of a provider network, and so on, in different embodiments. Different tasks of a given workflow may have respective distinct sets of execution resource options in at least some embodiments. In some embodiments, the execution resource options usable for a given task may be indicated in the corresponding workflow descriptor or configuration; in other embodiments, the workflow management service may be able to determine some number of feasible execution resource options for a given task, e.g., based on the configuration information available about the task, and the execution resource options need not be explicitly listed in the workflow descriptor.

Respective customized versions of a default workflow may be received at the WMS from several different clients or customers in some embodiments. An instance of a selected version of a set of linked workflows (e.g., a default version and zero or more customizations) may be triggered in response to a detection of an event in various embodiments. Such triggering events may include, among others, a receipt of a programmatic request associated a particular application (such as a web services request), a determination that some other workflow has been completed, and so on. In response to a triggering event, a workflow controller may select the particular version (such as the default version, or a particular customization) of a workflow, and then cause an execution of an instance of the selected workflow version in various embodiments. The version may be selected, for example, based on or one or more parameters or properties of the triggering event. For example, consider a scenario in which a particular default workflow WF1, which is to be triggered by an event of type E1, has two customizations: CWF1 provided to the WMS by a first client C1, and CWF2 provided to the WMS by a second client C2. When an event of type E1 is detected, the workflow controller may determine whether the event was generated by a source associated with C1 (such as a computing device located in a client network belonging to C1), by a source associated with C2, or by a source unaffiliated with wither C1 or C2. If the event was triggered by a source associated with C1, in one embodiment an instance of CWF1 may be started; if the event was triggered by a source associated with C2, an instance of CWF2 may be started; and if the event was triggered by a source associated with neither C1 nor C2, an instance of the default WF1 may be started. In other embodiments, properties other than source or origin may be used to select the version of the workflow to be instantiated—e.g., a version may be selected based on a parameter of a submitted programmatic request indicating the amount of resources required for the request, a security level of the request, and so on.

During execution of the selected version of the workflow, a particular execution resource from among a feasible set of execution resources or platforms may be selected by the workflow controller for individual tasks in different embodiments. A number of factors may be taken into account when selecting execution resources for a given task in some embodiments. For example, such factors may include, among others, a current workload level at a host of the WMS or some other service, a performance metric or goal, an availability objective or a security objective in one embodiment After one or more tasks of the selected version of the workflow complete, in some embodiments the workflow controller may verify that the specifications of the workflow definition associated with the instance are not violated. In one embodiment, for example, the result or output of the workflow instance as a whole may have to comply with specified formatting requirements, and the workflow controller may verify that the formatting requirements are satisfied before the instance is deemed to have been completed successfully.

In some embodiments, developers of a default or customized workflow version may provide a deployment artifact or bundle (such as an executable program file and associated configuration settings files and/or other metadata used at run-time) for a given workflow task, or for a set of workflow tasks, to the WMS. The customization of a workflow may, for example, indicate a network-accessible endpoint from which a deployment artifact of a particular customized task is accessible. The deployment artifact may be retrieved from the network endpoint and used during the execution of the workflow instance in various embodiments. The use of such deployment artifacts may further increase the flexibility associated with workflow design and execution in various embodiments, as the execution of the task may be decoupled from the selection of the specific platform where it is executed, as long as the platform is capable of executing the program indicated in the artifact.

As mentioned earlier, a number of different types of customizations may be applied to a default workflow definition or descriptor in different embodiments by WMS clients based on their needs. As long as the specifications of the inputs and outputs of the workflow as a whole, and any other rules defined for the workflow, are satisfied by a customization, the customization may be accepted as valid by the WMS in various embodiments. A particular default task may be replaced by one or more substitute tasks, for example, or two or more tasks of the default workflow may be replaced by a single consolidates task. In some embodiments, the definition of a default workflow may indicate that inputs and/or outputs of at least some tasks may be required to be encrypted using a particular algorithm or protocol, and the customized versions of that work flow may have to implement the required encryption as well. In some embodiments, using encrypted inputs and outputs may help ensure that sensitive data associated with a workflow is not made accessible even in the event that some input/output messages are intercepted or lost.

In at least some embodiments, programmatic interfaces of the WMS may be used by clients to register for or enter into service agreements with the WMS. As part of such agreements, rules regarding various aspects of subsequent interactions between the clients and the WMS may be provided—for example, the kinds of customizations that can be performed by a given client may be delineated, the types of tools to be used to develop and/or execute workflow tasks may be indicated, and so on. After the service agreement has been set up with a client, in at least some embodiments the WMS may verify that customized versions of various workflows provided by the client are in compliance with the service agreement. In at least some embodiments, a set of software tools that may be used during workflow design/development and/or during workflow execution may be provided to the client. Such tools may in some embodiments help to ensure compliance with the service agreement—e.g., a tool may verify that a customized workflow being submitted (using the tool) on behalf of a client does not violate the service agreement. In some embodiments, an automated notification mechanism may be set up with respect to new versions of workflows which may be developed by either the WMS or by the clients/customers of the WMS. For example, using an automated notification interface, the WMS may be informed when an updated customized version of a given workflow becomes available. The WMS may then upload the updated version to its workflow repository, and use the updated version for subsequent instances of workflow execution as needed in various embodiments. Similarly, using an automated notification interface, a client may be informed when an update to a default workflow becomes available, enabling the client to download the updated default version and generate new customizations if needed.

Example System Environment

FIG. 1 illustrates an example system environment in which a workflow management service which support customized dynamic selection of execution platforms for workflow tasks may be implemented, according to at least some embodiments. As shown, system 100 may include resources of a plurality of network-accessible services of a provider network 101, including a workflow management service (WMS) 105. A provider network 101 may sometimes be referred to as a "public cloud" environment. The resources of a provider network may in some cases be distributed across multiple data centers, which in turn may be distributed among numerous geographical regions (e.g., with each region corresponding to one or more cities, states or countries). In the depicted embodiment, provider network 101 may also include resources of computing services 130A and 130B at which respective models of resource provisioning may be implemented, and a storage service 134.

The workflow management service may include, for example, an artifact repository 108, local execution resources 111, interaction/communication managers 120 as well as one or more workflow controllers 114 in some embodiments. The artifact repository 108 may be used to store, among other objects, default and/or customized workflow descriptors or specifications, input provided to various workflow instances, output produced by various workflow instances, service agreements made with clients of the WMS and so on in the depicted embodiment. Local execution resources 111 may comprise, for example, various hardware and/or software components which can be used to configure and run workflow instances. Interaction/communication managers 120 may comprise one or more hardware and/or software components responsible for receiving messages via SMS programmatic interfaces 167, such as messages received from workflow task development environments 124 and/or WMS client networks 146 in the depicted embodiment. A variety of programmatic interfaces may be implemented in different embodiments, such as a set of APIs (application programming interfaces), a web-based console, command line tools, graphical user interfaces and the like. The interaction/communication managers 120 may also be responsible in some embodiments for transmitting responses to requests received via messages from various devices external to the WMS 105.

Workflow controllers 114 may comprise one or more computing devices in the depicted embodiment. A given workflow controller 114 may comprise, for example, one or more configuration managers 116 and one or more execution managers 118. The configuration managers 116 may be responsible for verifying the configurations of default and/or customized workflow descriptors submitted by developers from developer resources 126, checking whether the descriptors satisfy the static (pre run-time) requirements of the WMS, whether a given customized workflow descriptor meets the requirements of its corresponding default or baseline workflow descriptor, and so on in various embodiments. The execution managers 118 may be responsible for orchestrating the run-time behavior of workflows in some embodiments: for starting up instances of workflows, e.g., by selecting the particular execution resources for individual ones of the workflow tasks as each task becomes ready for execution, launching a new process or thread for a task if required, retrieving deployment artifacts if needed, passing control to resources at other services such as 130A or service 130B for the execution of some tasks if needed, etc. In some embodiments, the functionality of a workflow controller 114 may not necessarily be partitioned among subcomponents (configuration managers and execution managers) as indicated in FIG. 1. In at least one embodiment, separate interaction/communication managers 120 may not be required; instead, for example, a workflow controller may implement communications with external entities such as workflow developers and/or clients.

In the depicted embodiment, a service agreement may be established between the WMS and a client, such as a client associated with client network 146, e.g., using one or more messages exchanged via the WMS programmatic interfaces 167. The service agreement may for example govern the types of subsequent programmatic interactions the client is allowed to participate in, the types of workflows the client is permitted to use or modify/customize, performance targets associated with various workflow tasks, metrics the client is to be provided regarding workflow instances, and so on. In at least some embodiments, a WMS tool set 152 comprising some number of software and/or hardware components may be provided to a client in accordance with a service agreement. The tool set 152 may be used, for example, to interact with various components of the provider network 101 in accordance with WMS policies, e.g., to request execution of workflow tasks at one or more services of the provider network, to store customized configurations or deployment artifacts in the provider network, to check code and/or data for compatibility with WMS standards or requirements, and so on in different embodiments. The WMS may verify that custom workflows generated by a given client are in compliance with the relevant service agreement set up with the client in some embodiments, and non-compliant workflow customizations may be rejected.

A workflow manager 114 may be responsible for transmitting or providing (e.g., with the help of interaction/communication managers 120) a descriptor of one or more workflows which may be customizable to a client of the WMS 105. Such descriptors or definitions may be expressed using any of a variety of languages in different embodiments, such as variants of JSON (JavaScript Object Notation), XML (Extensible Markup Language) and the like. In some embodiments, a definition may be provided in response to a request submitted by a client via WMS programmatic interfaces. The default definitions provided by the WMS to clients may include tasks that have been generated by developers using resources 126 (e.g., software code repositories, tools such as compilers, integrated development environments (IDEs) etc.) in various embodiments, and submitted to the WMS from the developer resources. At the WMS, a configuration manager 116 may store persistent representations of the tasks and their parent workflow descriptors in artifact repository 108 in the depicted embodiment. In at least some embodiments, workflows may be subdivided into relatively small or] simple tasks, making it easy for a given developer to write the corresponding code without having to be aware of at least some other tasks of the same workflow. In addition, in various embodiments, task developers need not necessarily be aware of the particular type of execution resources at which the tasks they prepare will be run during a given instantiation of a workflow. In one embodiment, a developer may have a set of possible execution platform types in view when developing the software to be used for the task, and may indicate the possible execution platforms choices explicitly or implicitly in the task software or associated metadata provided to the WMS. A given workflow, which may comprise a plurality of tasks as discussed below in further detail with respect to FIG. 2, may have a descriptor or definition which indicates at least the input requirements and output requirements of the workflow. Individual tasks of a workflow may also have respective input requirements and output requirements in the depicted embodiment. In some embodiments, developers may generate deployment artifacts (e.g., executable program code together with associated metadata) which can be used to implement respective tasks at a variety of execution platforms, and provide the deployment artifacts to the WMS (or indicate a network endpoint from which the deployment artifacts can be obtained). Individual workflow instances may be triggered by one or more events (such as a request submitted via a web services interface, or the completion of some other workflow) and descriptors of the triggering events may be included in the workflow descriptors stored in artifact repository 108 in various embodiments.

In various embodiments, a workflow manager 114 may also receive customized versions or customizations of a given workflow descriptor or task, e.g., from a client who may have their own workflow developers and associated development environments or resources. A given default workflow may be modified in any combination of several ways to produce a customization in the depicted embodiment—e.g., tasks may be added or removed, some tasks may be substituted by alternative tasks, the set of feasible execution platforms for a task may be modified, and so on. A give task of a customized workflow may also have several different execution resource options associated with it in various embodiments. The WMS may store customized versions of workflows in repository 108 in the depicted embodiment.

In response to a triggering event, a workflow controller may identify which default or customized workflow is to be instantiated for the event based on a variety of factors or parameters in different embodiments. In some cases, the type of event may indicate the set of default and/or custom workflows from which one is to be selected—e.g., some applications may be associated with just one default workflow and its customizations. Parameters of a request directed to a given application may enable the workflow controller 114 in some embodiments to determine which custom version should be used, or whether a default version of the workflow should be used instead. For example, in one embodiment, requests directed to a given application may be generated from three geographic regions defined by the application owners—North America, Europe, and Asia-Pacific. Respective customized versions CWF-NA, CWF-EU and CWF-AP of a default workflow associated with the application may be created for the three regions, and individual requests directed to the application may indicate the country or region of origin. Based on the origin region of an application request which triggers a workflow instance, the workflow controller 114 may select the customized version to be instantiated in such an example scenario—e.g., an instance of CWF-NA may be launched for a request from North American instance of CWF-EU may be launched for a request from Europe, and an instance of CWF-AP may be launched for a request from the Asia-Pacific region.

With respect to individual tasks of the selected version of the workflow, the workflow controller 114 may select from the available execution platform resources based on any combination of several factors in the depicted embodiment. In some cases, the workload level of a local execution resource 111 may be taken into account—e.g., if the available local resources are heavily utilized, it may be preferable to use a resource outside the WMS, such as one or more execution resources 132A or 132B at computing services 130A or 130B respectively. Goals, objectives or targets for performance, availability, security and the like may also or instead be considered when selecting execution resources for a given task. At computing service 130A, resources for requested operations (such as a task of a workflow) may be provisioned dynamically from among execution resources 132A, after a request for the operation triggers the provisioning in the depicted embodiment. Such computing services which support dynamic event-driven provisioning may be referred to as "server-less" computing services in some embodiments, as specific servers may not have to be acquired in advance of the processing of various client-requested operations. In contrast, at computing service 130, resources may be provisioned on behalf of clients prior to the execution of operations for the client in the depicted embodiment, e.g., in response to explicit client allocation requests. In some embodiments, in order to execute a given workflow task, a deployment bundle or artifact may have to be retrieved, e.g., from storage resources 136 and transmitted to the selected execution resource. Some customized tasks may require that execution resources 148 of a client network 146 be used—e.g., if the client has specialized computing devices that are suitable for the task, or if the client has concerns regarding security which can be satisfied if the client's own resources are used. After all the tasks of a given workflow instance are completed and the results are verified with respect to the output specification of the workflow's descriptor/configuration, the results may be stored (e.g., at artifact repository 108 and/or storage resources 136) or transmitted (e.g., to client network 146, or to another workflow instance) in various embodiments.

Simple Workflow Example

Figure 2:
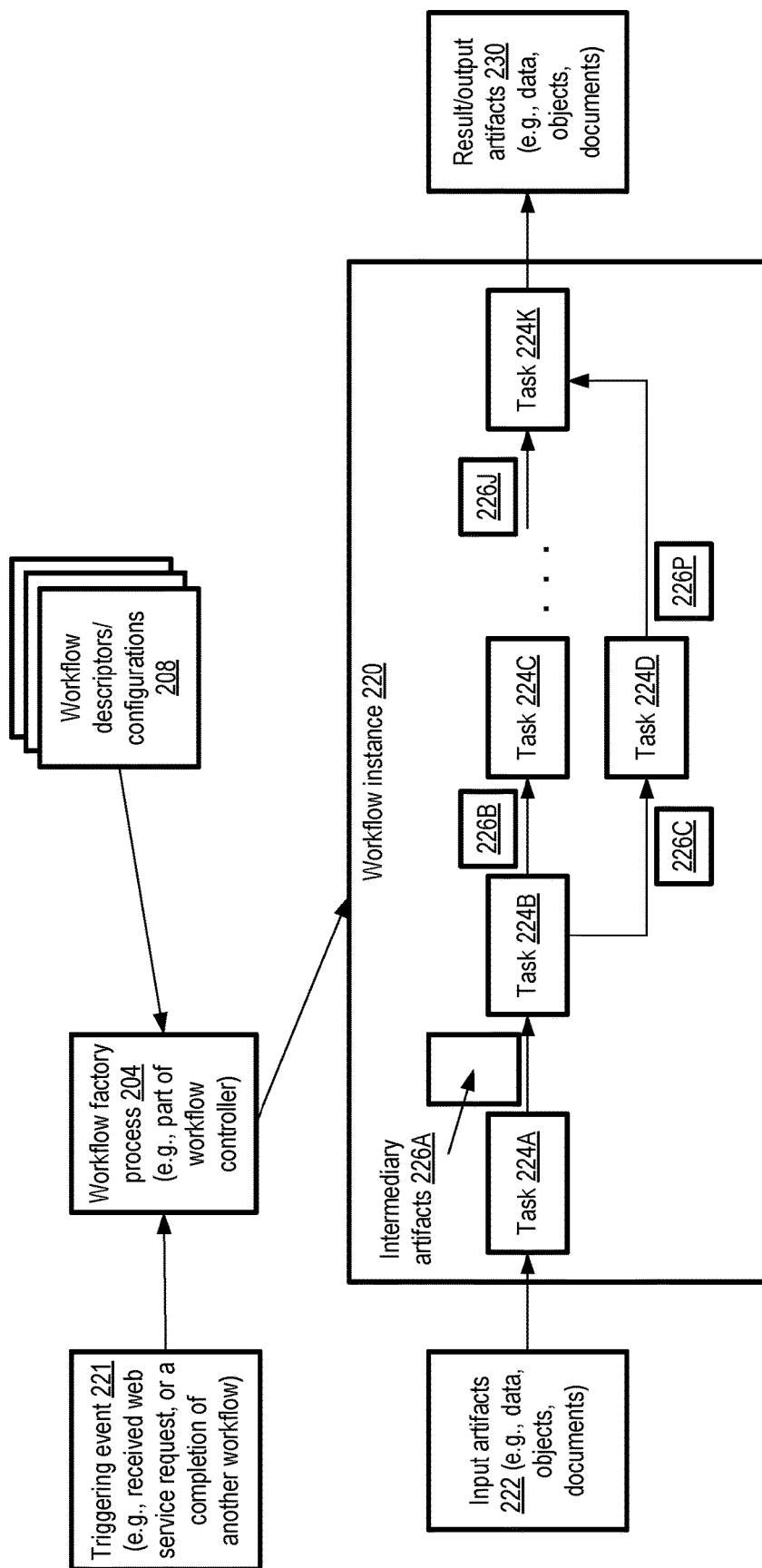
FIG. 2 illustrates a simple example of an instance of a workflow, according to at least some embodiments.

FIG. 2 illustrates a simple example of an instance of a workflow, according to at least some embodiments. In the depicted embodiment, a workflow factory process 204 (which may be one of the processes which form a workflow controller) may obtain a workflow descriptor or configuration 208 from a repository and start up a corresponding workflow instance 220. The workflow factory process 204 may instantiate the workflow based at least in part on a triggering event 221 (e.g., a detection that a web service request directed to an application has been received, or that a task of another workflow instance has completed) in some embodiments. In at least one embodiment, some workflow instances may be started based on a schedule, in which case the triggering event may comprise a detection that a particular time interval has elapsed since a previous instance of the same workflow was started. A workflow factory process 204 may itself be instantiated, for example, by the equivalent of a "fork( )" command, by a workflow controller in response to some triggering event such as the receipt of a programmatic request in some embodiments, or as part of the startup of the workflow controller.

Workflow instance 220 may comprise a plurality of tasks 224 in the depicted embodiment, such as tasks 224A, 224B, 224C, 224D and 224K. A respective set of one or more input artifacts may be consumed by at least some of the tasks 224, and a respective set of one or more output artifacts may be produced by at least some of the tasks 224. The input artifacts 222 of task 224A, for example may comprise one or more data sets, objects or documents, may represent input of the workflow as a whole. In at least some embodiments, an input specification of the workflow as a whole may be provided as part of the descriptor or configuration 208 of the workflow, and an output specification of the workflow as a whole may be provided as part of the descriptor/configuration of the workflow. Workflow descriptors 208 may also be referred to as workflow definitions in some embodiments. In various embodiments, a component of the workflow management service (such as a workflow factory process 204, which may in turn be part of a workflow controller) may be responsible for verifying that the input and/or output of an individual workflow instance satisfies or meets the corresponding specifications, regardless of the particular execution resources which were used for individual tasks of the instance, and regardless of whether a default or customized version of the workflow was instantiated.

Intermediate artifacts 226A may form the output of task 224A and the input of task 224B in the depicted scenario. Intermediate artifacts 226 of various workflow tasks 224, as well as result/output artifacts 230 of the workflow as a whole, may each comprise one or more documents, objects or data sets in the depicted embodiment. As shown, task 224B may produce intermediate artifacts 226B (which form the input of task 224C) as well as intermediate artifacts 226C (which form the input of task 224D). Intermediate artifacts 226P and 226J may be fed as input to task 224K, whose output may form the results of the workflow instance in the depicted scenario. In at least some embodiments, specifications of at least some subset of the intermediate artifacts (artifacts used as inputs within the workflow instance) may be included in the corresponding workflow descriptor 208. In one embodiment in which the intermediate descriptors are specified in the workflow descriptor, an indication may be provided that while the specifications of the input artifacts 222 and the result/output artifacts 230 of the workflow instance as a whole are mandatory (i.e., that customizations of the workflow are also expected to consume the specified types of input and produce the specified types of output), the specifications of the intermediate artifacts are not mandatory. In some embodiments, intermediate artifact specifications may not be included in workflow descriptors. In one embodiment, at least some of the intermediate artifact specifications may be mandatory.

As indicated in FIG. 2, in at least some embodiments multiple tasks of a given workflow instance may be executable in parallel—e.g., tasks 224C and 224D may be run concurrently as soon as intermediate artifacts 226B and 226C become available. In other embodiments, workflows may comprise strictly sequential pipelines of tasks. In order to execute workflow instance 220 in the depicted embodiment, respective execution resources or platforms may be identified for each task 224, e.g., either dynamically (at the time that the input for the task becomes available) or more statically (in advance of the time that the task can begin). The workflow factory process 204 may be responsible for selecting the execution platform in at least some embodiments. In other embodiments, individual tasks may be responsible for selecting execution platforms for their successor task(s)—e.g., task 224A may determine where task 224B is going to run, task 224B may determine where tasks 224C and 224D are to be run, etc. The types of execution resources which can be used for a given task may also be indicated in the task definition in some embodiments, which may form part of the workflow descriptor or configuration 208.

Customized Workflow Example

Figure 3:
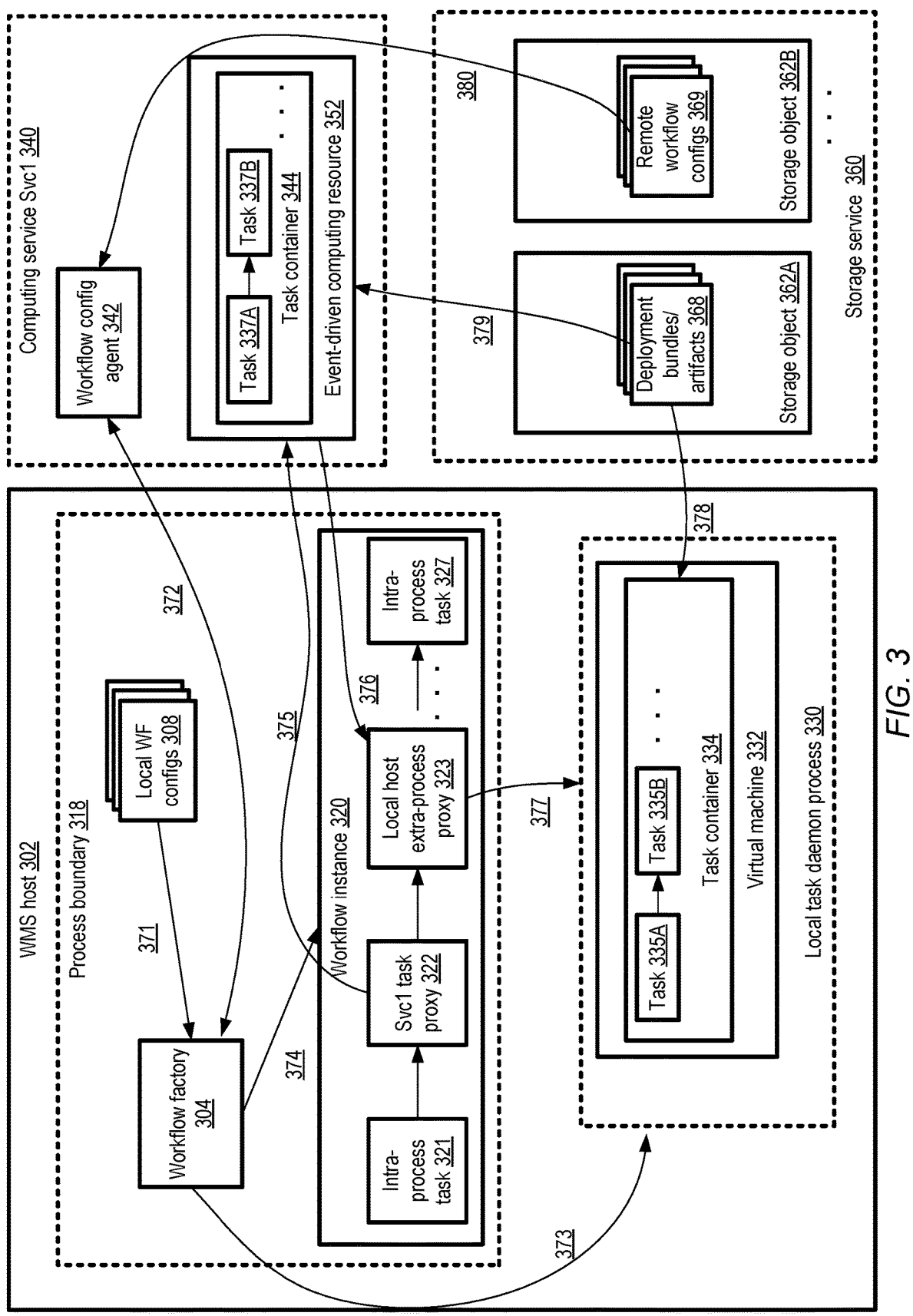
FIG. 3 illustrates examples of the deployment of a variety of execution platforms for a customized workflow instance, according to at least some embodiments.

FIG. 3 illustrates examples of the deployment of a variety of execution platforms for a customized workflow instance, according to at least some embodiments. In the depicted embodiment, workflow tasks may be executed, for example, at one or more processes at a host 302 of the workflow management service (WMS) itself, or using an event-driven computing resource 352 of a computing service Svc1 340 external to the WMS.

In the depicted embodiment, workflow configurations or descriptors may be stored in various locations, such as locally at the WMS host 302 (in the case of local workflow configurations 308) or at one or more storage objects 362B of a storage service 360 external to the WMS 320 (as in the case of remote workflow configurations 369). The workflow factory 304, operating within process boundary 318 may extract a customized workflow configuration from among its local set of configurations 308 in the depicted embodiment as indicated by arrow 371, and start up a corresponding workflow instance 320 as indicated by arrow 374. The customized workflow may comprise at least four tasks in the depicted embodiment.

As indicated by their names, intra-process tasks 321 and 327 may be run within the same process as the workflow factory 324 in the depicted example scenario, as indicated by their position within process boundary 318. It is noted that the designation of the tasks 321 and 327 as intra-process may represent a run-time choice made by the workflow factory; that is, in another instance of the same customized workflow, the first and last tasks of the workflow may be run outside the process boundary 318. A proxy 322 for one or more tasks of instance 320 to be executed at computing service 340 may utilize a task container 344 to run tasks such as 337A or 337B as indicated by arrow 375. The task container 344 may, for example, comprise a stand-alone executable package for a set of software code that includes everything needed to run tasks such as the task code itself, a runtime, any system tools or libraries which may be needed, required configuration settings if any, and so on. The tasks 337A and/or 337B may form part of the customized workflow in the depicted embodiment, even though they are run at devices separate from the WMS host 302. The output of the tasks run at container 344 as part of workflow instance 320 may be provided as input to the next task of the instance, as indicated by arrow 376 in the depicted embodiment.

A local host extra-process proxy 323 for another set of one or more tasks of the workflow instance 320 may communicate with a local task daemon process 330 of host 302 in the depicted embodiment, e.g., providing input artifacts for one or more tasks of the instance 320 which are to be run using a process other than the workflow factory process. The local task daemon process 330, which may itself be launched or deployed by the workflow factory 304 as indicated by arrow 373, may comprise one or more virtual machines 332 (e.g., Java™, JavaScript or Python virtual machines) in the depicted embodiment. Within a particular virtual machine 332, one or more task containers 334 may be used to run tasks such as 335A or 335B of the workflow instance 320. In some embodiments, deployment bundles 368 for one or more tasks 335 may be obtained from storage object 362A of storage service 360, as indicated by arrow 378. Deployment bundles 368 may also be obtained from the storage service 360 for executing tasks at event-driven computing resources 352 of the computing service 340 in the depicted embodiment, as indicated by arrow 379. In some embodiments, depending for example on the particular storage service being used, a given storage object 362 may have an associated network-accessible endpoint (such as a Uniform Resource Identifier or URI) from which the deployment bindles 368 and/or remote workflow configurations may be retrieved when needed, e.g., by a workflow controller. Deployment bundles may also be referred to in various embodiments as deployment artifacts. In at least some embodiments, the computing service 340 may also comprise one or more workflow configuration agents 342, which may extract remote workflow configurations 369 from network-accessible endpoints of storage service 360 (as indicated by arrow 380) and start corresponding instances. It is noted that in some embodiments in which deployment artifacts are used, the code that is used for executing a particular workflow task may not necessarily be stored in advance in a pre-packaged fully executable form—e.g., accessing a deployment artifact from an associated network-accessible endpoint may trigger the dynamic generation of code for the task.

As shown, in the depicted embodiment, some tasks may be run in the same process 318 as the workflow factory 304 which starts up the workflow instance 320, other tasks may be run in other processes 330 on the same host as the workflow factory, while still other tasks may be run using computing services such as Svc1. Many tasks may utilize other services of a provider network, such as storage service 360. It is noted that FIG. 2 indicates only a small number of the possible execution resource options which may be used for workflow tasks in various embodiments. Additional resource options which may be used in some embodiments are discussed below in the context of FIG. 6.

Example Programmatic Interactions

Figure 4:
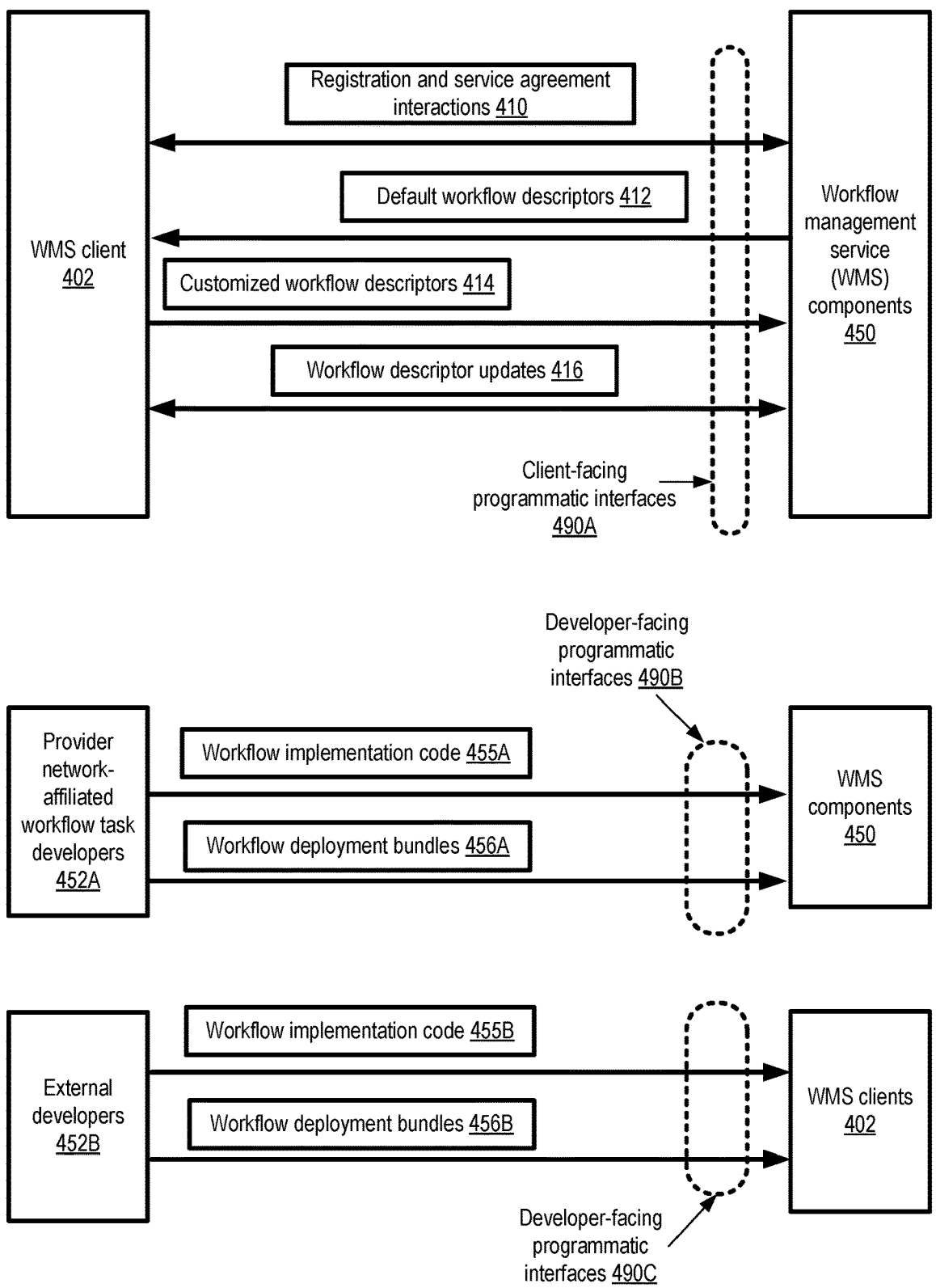
FIG. 4 illustrates example interactions between a workflow management service, its clients, and workflow task developers, according to at least some embodiments.

FIG. 4 illustrates example interactions between a workflow management service, its clients, and workflow task developers, according to at least some embodiments. In some embodiments, as indicated earlier, one or more programmatic interfaces may be implemented by the workflow management service. The programmatic interfaces may include, for example, one or more sets of APIs (application programming interfaces), web-based consoles, command-line tools, graphical user interfaces and the like. In the depicted embodiment, a set of client-facing programmatic interfaces 490A and a set of developer-facing programmatic interfaces 490B may be implemented by the WMS. A client of the WMS may have their own set of developers (e.g., either internal to the organization of the client, or external to the organization), and in some embodiments such developers may interact with WMS clients using developer-facing programmatic interfaces 490C.

Before a client 402 can utilize the customizable workflow capabilities of the WMS, in at least some embodiments client-facing programmatic interfaces 490A may be used for interactions 410 related to registration of the client with the WMS and/or to exchange information about a service agreement which defines terms and conditions for using the WMS. In at least some embodiments, the client may be able to retrieve or obtain default workflow descriptors 412 via the programmatic interfaces 490A. A client may customize the workflow definitions/descriptors in various embodiments, e.g., using the client's own developers and resources and/or using provider network resources. The specific types of customizations which are permitted may be governed by service agreements in at least some embodiments. Customized workflow descriptors 414 may be submitted using the programmatic interfaces 490A to the WMS in some embodiments, and such customizations may be stored in the WMS artifact repositories together with the default workflow definitions/descriptors. In at least some embodiments the client-facing programmatic interfaces 490A may include interfaces for one or more automated notification mechanisms. Such mechanisms may be used, for example, to notify a WMS client 402 automatically if and when a default workflow definition is updated at the WMS, and/or to notify the WMS components 450 automatically if and when a customized workflow descriptor is changed on behalf of the WMS client in various embodiments. Such automated workflow descriptor updates 416 may enable changes made by either side (i.e., the workflow management service or the clients) to be propagated transparently with a minimum of effort. In one implementation, for example, if and when a check-in to a source code repository storing customized workflows of the WMS client is made, the changes may also be propagated automatically (e.g., after some security-related checks) to a source code repository of the WMS, and vice versa.

Provider network-affiliated developers 452A may submit code 455A corresponding to workflow tasks (or entire workflows) via programmatic interfaces 490B in the depicted embodiment. In addition, in at least some embodiments, workflow deployment bundles 456A (which may contain executable versions of the code for tasks/workflows, along with associated metadata which may be used at run-time) may also be submitted to the WMS components 450 via the programmatic interfaces 490B. Similarly, external developers 452 (who may not necessarily be affiliated with the provider network or the WMS, but may in some cases be affiliated with or hired by the WMS clients) may also submit workflow implementation code 455B and/or deployment bundles 456B to WMS clients 402 via programmatic interfaces 490C in at least some embodiments. The WMS clients 402 may in turn store the workflow code or bundles at network-accessible endpoints or locations (e.g., within a storage service of the provider network) from which they can be retrieved to execute workflow tasks.

Customization Examples

Figure 5:
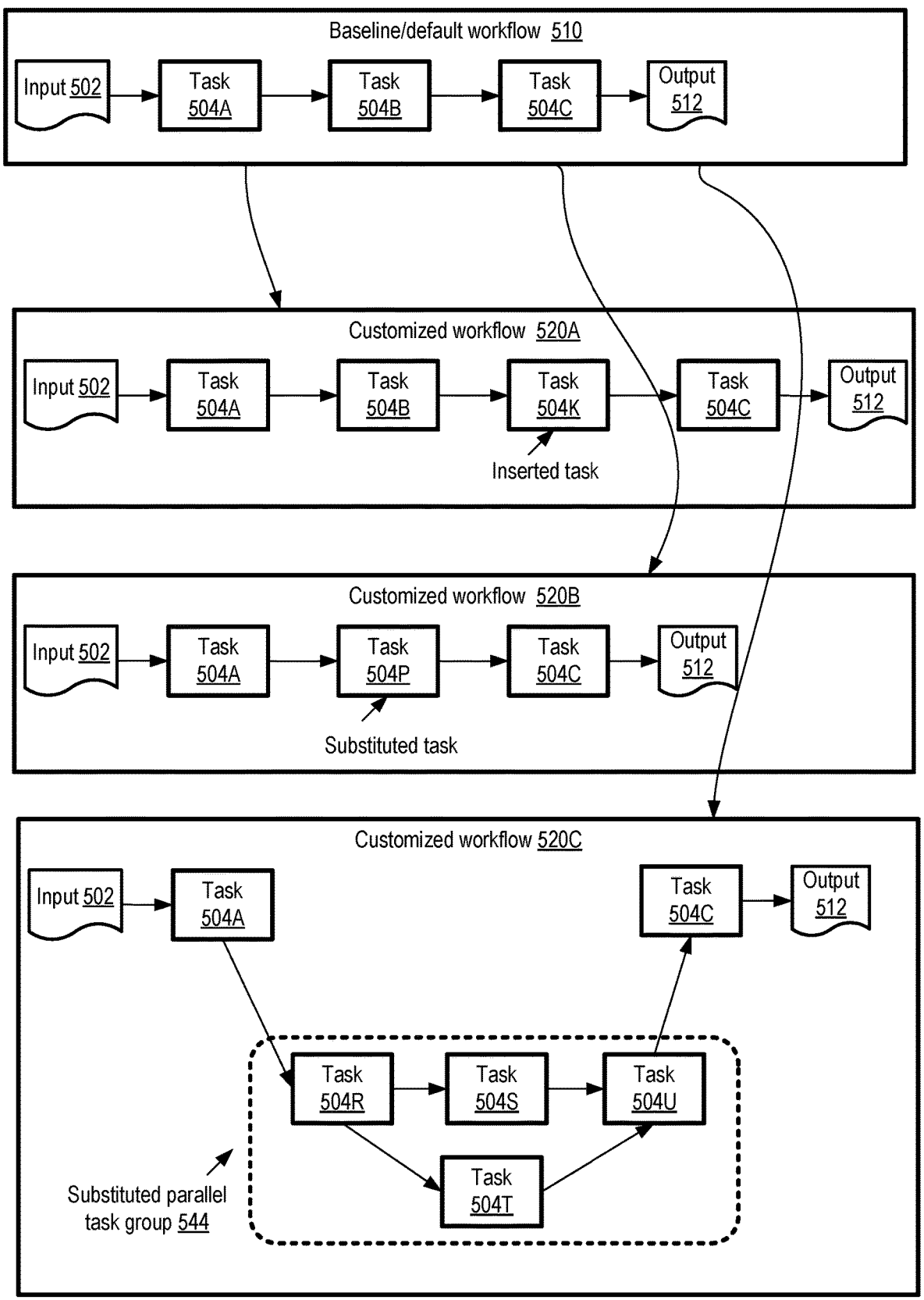
FIG. 5 illustrates example customizations of a workflow, according to at least some embodiments.

FIG. 5 illustrates example customizations of a workflow, according to at least some embodiments. In the depicted example, three alternatives for customizing a simple default or baseline workflow 510 comprising a task sequence of three tasks are shown. Baseline workflow 510 comprises a pipeline or sequence of tasks 504A, 504B and 504C. Input 502 is provided to the first task 504A of the sequence, and output 512 is eventually generated by the last task 504C of the sequence.

In at least some embodiments, a client of the WMS may customize a workflow by adding one or more tasks that were not part of the default version. In customized workflow 520A, for example, task 504K is inserted after task 504B of the default task sequence, and before task 504C of the default task sequence. The input 502 and the output 512 of the workflow as a whole may remain unchanged after the customization in the depicted embodiment. In some embodiments, the inputs and outputs of the individual workflow tasks may also remain unchanged by the customization—e.g., newly inserted task 504K may consume the same types of intermediate artifacts that were generated in the default workflow by task 504B, and task 504K may generate the same types of intermediate artifacts for its successor task 504C as were consumed by task 504C in the default implementation. In other embodiments, at least some inputs and/or outputs of individual tasks may change as a result of customization.

In a second example of customization, a custom task 504P may replace or substitute task 504B of default workflow 510 in the depicted embodiment, as indicated in customized workflow 520B. Once again, the inputs and outputs of the workflow as a whole may be unaffected by the customization.

In a third example of customization, a default workflow task such as 504B may be replaced by a substitute parallel task group 544, comprising tasks 504R, 504S, 504T and 504U as shown in customized workflow 520C, again without affecting the external inputs and outputs of the workflow as a whole. Other types of customizations may be supported in various embodiments, such as removal of one or more tasks, re-ordering of tasks, changes to the set of execution resources allowed for one or more tasks, and so on.

Execution Resource Options

Figure 6:
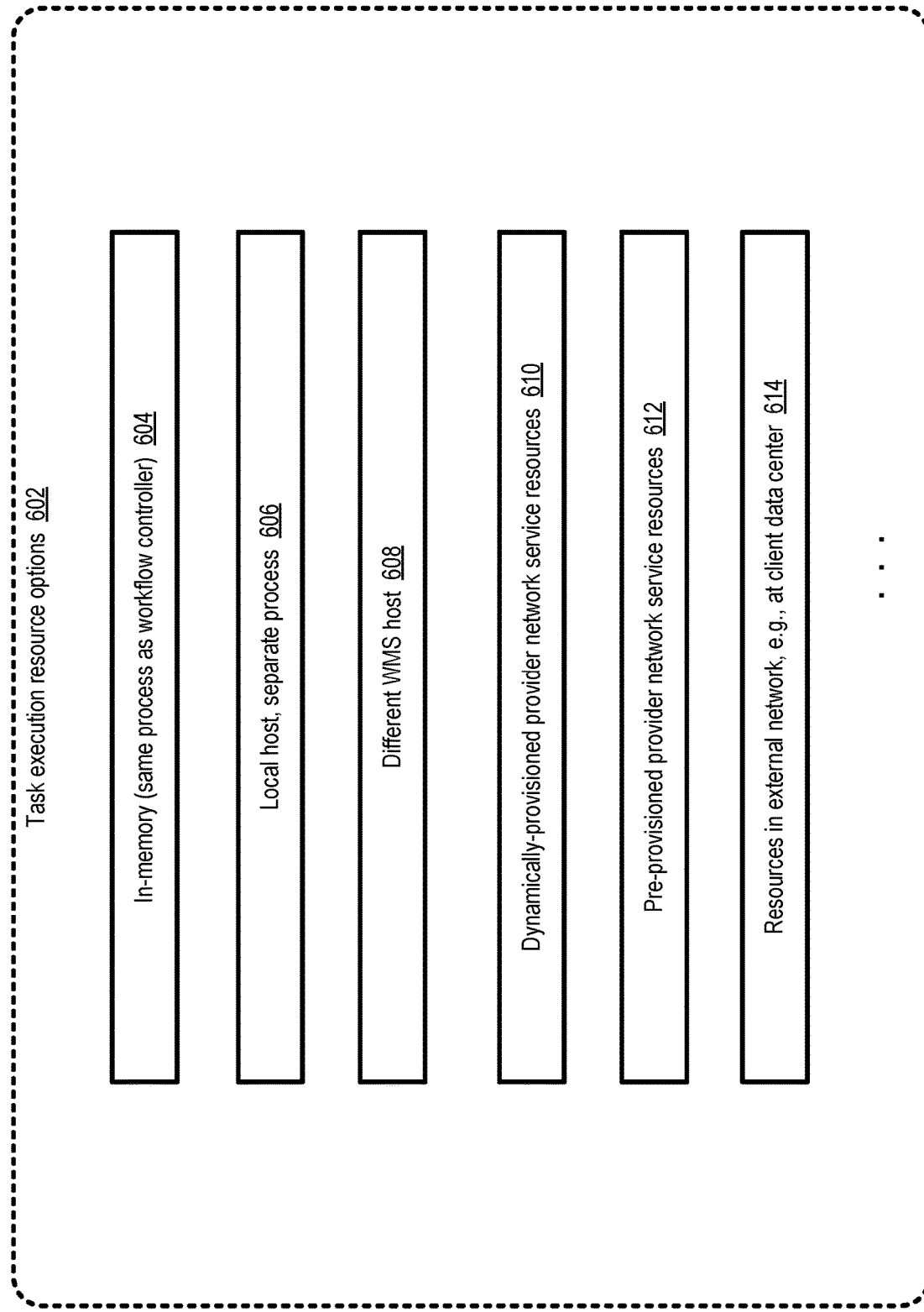
FIG. 6 illustrates examples of execution resource options for workflow tasks, according to at least some embodiments.

FIG. 6 illustrates examples of execution resource options 602 for workflow tasks, according to at least some embodiments. Two choices are shown for executing a task at the host at which a workflow controller or workflow factory runs. If the in-memory option 604 is selected for a task, the task may be executed within one of the processes being used for the workflow controller (e.g., the same process as is being used for a workflow factory). In some cases, a separate process on the same host may be used for one or more tasks, as indicated by option 606 labeled "local host, separate process" in the depicted embodiment.

For some tasks of a workflow, in some embodiments a different host of the workflow management service may be employed, as indicated by the label "different WMS host" of option 608. A fleet of hosts may be maintained in some embodiments at the WMS for workflow task execution (e.g., as part of local execution resources 111 shown in FIG. 1), and a host may be selected from such a fleet for a particular workflow task.

In an embodiment in which the WMS is established within a provider network which also comprises one or more computing services, the resources of such services may be used for executing some workflow tasks. In some embodiments, as discussed above, a provider network may comprise a computing service in which resources do not have to be pre-provisioned; instead, a platform for executing a particular task or operation may be dynamically provisioned in an event-driven manner. Such dynamically-provisioned provider network service resources 610 may provide one option for executing workflows in the depicted embodiment. In at least some embodiments, pre-provisioned provider network service resources 612 (such as guest virtual machines which are reserved for the use of one or more service clients at a virtualized computing service) may be utilized for workflow tasks if needed.

Resources 614 outside a provider network, such as virtual or physical machines at a client's data center may be utilized for one or more workflow tasks in different embodiments. In various embodiments, any desired resources or platforms may be used for workflow tasks, e.g., as long as a network-based mechanism is available to enable a workflow controller (or an agent of the workflow controller) to instantiate or identify the threads or processes of execution which are to be used for a task, to provide the input artifacts for the task, and to retrieve or obtain output artifacts from the task. The particular execution resource or platform for execution of a given task may be selected based on any combination of a variety of factors in various embodiments. In at least one embodiment, some of the workflow tasks may be long-running or continuous in nature—for example, the execution lifetime of a given task may extend to days, weeks or months, depending on the nature of the workflow. In some cases in which a task has a long lifetime, its execution resources may change over time—e.g., it may be initially started using one execution platform, migrated to another execution platform if needed, and so on.

Example Factors for Selecting Task Execution Resources

Figure 7:
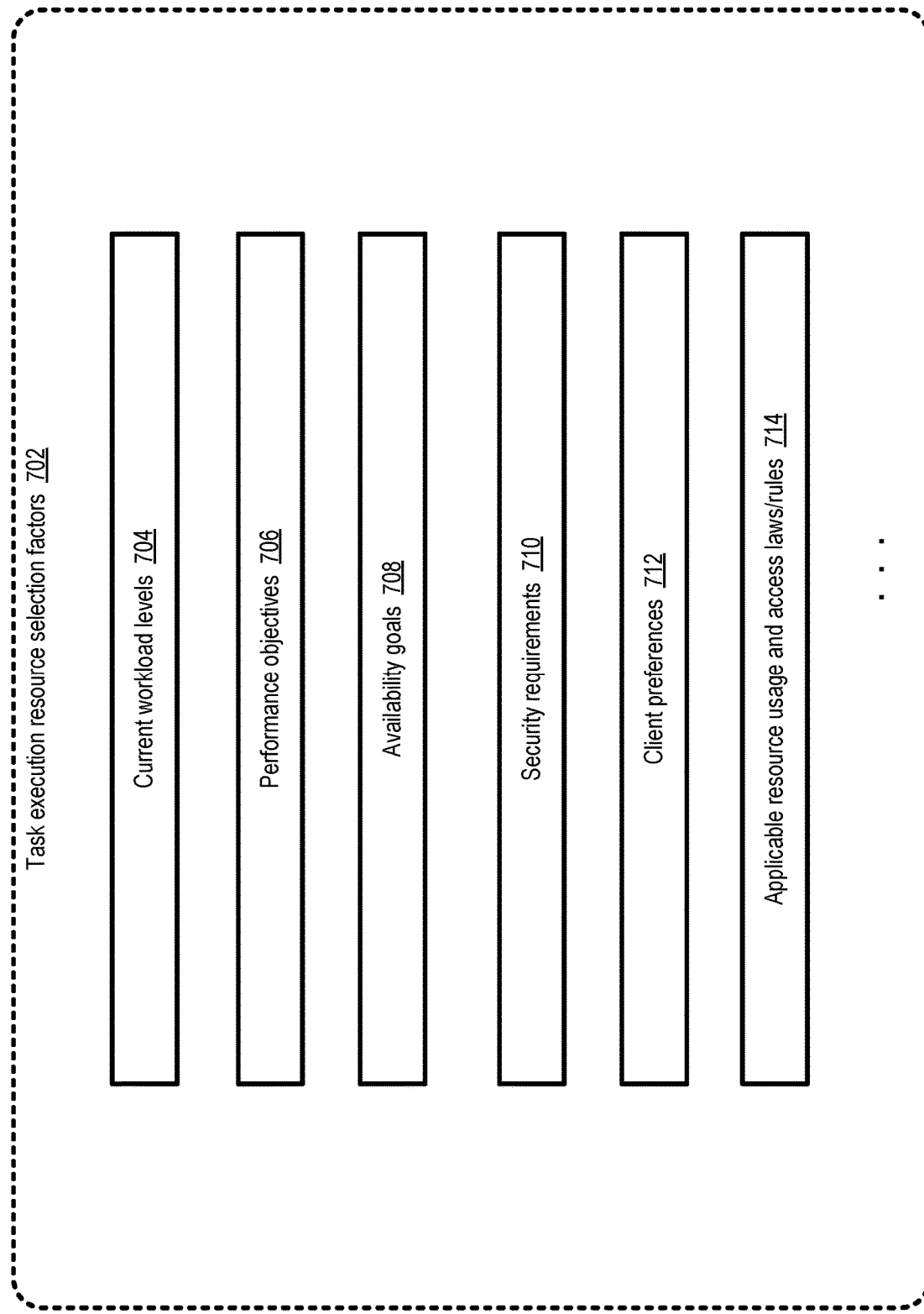
FIG. 7 illustrates examples of factors which may be taken into account to select an execution platform for a given workflow task, according to at least some embodiments.

FIG. 7 illustrates examples of factors which may be taken into account to select an execution platform for a given workflow task, according to at least some embodiments. As shown, factors 702 may include, among others, current workload levels 704, performance objectives 706, availability goals 708, security requirements 710, other client preferences 712 and/or applicable resource usage/access laws or rules 714 in the depicted embodiment.

In some embodiments, other factors being equal, a given task may first be considered for execution in-memory, e.g., within the same process as the workflow controller responsible for the task. However, if the host at which the workflow controller is running is overloaded, or its current workload level 704 has reached a threshold, a different host may be selected.

In at least one embodiment, individual tasks or a workflow as a whole may have associated performance targets—for example, a workflow for responding to a request to purchase an item at a web site may have to be completed within N milliseconds based on service level agreements. In such a scenario, an execution platform may be selected based at least in part on a performance objective 706—e.g., a host whose processor speed is above a threshold may be selected. Availability goals 708, such as a maximum downtime rate or failure rate for a given task, may be used to select execution platforms in some embodiments.

As indicated earlier, in at least one embodiment some tasks may include processing of sensitive data for which a high degree of security is desired. For tasks with such security requirements 710, in some embodiments, execution resources located at client premises may be used, or special high-security computing platforms may be employed. In at least one embodiment, clients may indicate particular preferences 712 for one or more tasks of workflow instances being run on the clients' behalf, and such preferences may guide the selection of execution platforms for those tasks. For example, in one embodiment a client of the WMS may have reserved a set of virtual or physical machines of a provider network's computing service for the purpose of running workflow tasks, and a directive to use those machines may be provided programmatically to the WMS. Using the client's own resources for executing their workflows may help the clients to control billing costs in some embodiments—e.g., pre-reserved resources which have already been paid for but are currently idle may represent a cheaper alternative than acquiring new computing resources. In some embodiments, applicable laws or rules 714 governing the kinds of resources that can be used or accessed may come into play when selecting the execution platforms to be used for one or more workflow tasks. For example, in some countries or other types of jurisdictions (e.g., economic communities or blocs, states, cities, etc.), it may be the case that privacy or security-related laws require resources physically located within that country or jurisdiction to be used for certain types of data processing. Such constraints may impact the selection of resources for one or more workflow tasks—e.g., if a request to instantiate a workflow or task is received from country C, resources at a data center within country C may be selected in view of the applicable laws.

Workflow Specification Example

FIG. 8 illustrates an example portion of a workflow specification, according to at least some embodiments. In the depicted embodiment, a format similar to JSON (JavaScript Object Notation) may be used for the workflow descriptor 802. In other embodiments, other languages or formats may be used, such as for example a version or extension of XML (Extensible Markup Language), plain text, and so on.

The "mapping" portion of descriptor 802 may be used, for example, to indicate a class (as expressed in a programming language) corresponding to a mapping to be used to identify a workflow controller for an instance of the workflow, a client associated with the workflow, as well as additional attributes of the workflow such as a "productLine" and an "actionType". The information contained in the mapping portion may be used, for example, to identify the client on whose behalf instances of the workflow are to be run, and to identify at least some of the resources to be used for the instances.

The "workflow" portion of the example descriptor may include respective stanzas for a sequence of tasks of the workflow, as well as metadata such as a version number of the workflow, an identifier of the workflow, and a class of the workflow in the depicted embodiment. For some of the individual tasks of the workflow, such as the tasks identified by "custCheck" and "oValidation" in the depicted example, an executable class (such as "process.owner.custcheck" or "process.owner.offervalidation") may be indicated. For other tasks, as in the case of the task with identifier "client-task-set1", a network endpoint or URL (uniform resource locator) from which a deployable package for the task may be retrieved may be indicated in the descriptor 802. Configuration information for using an execution resource from a service other than the WMS may be indicated for such tasks in some embodiments. For example, the title of the clause "DynamicProvComputingSvc1" may indicate that a dynamic provisioning computing service of a provider network is to be used for the task, and the contents of the clause may be used by the workflow controller to submit an execution request to the service.

It is noted that although a very simple example of a workflow specification has been provided by way of illustration in FIG. 8, in various embodiments more complex workflows may be specified using a similar formatting approach. Sequencing information about the workflow tasks (e.g., pointers to parent tasks and/or child tasks) may be included in such specifications, e.g., especially when parallel executions of separate tasks are possible. Multiple alternatives for execution resources usable for a given task may be indicated in such specifications.

Methods for Customizable Workflows

Figure 9:
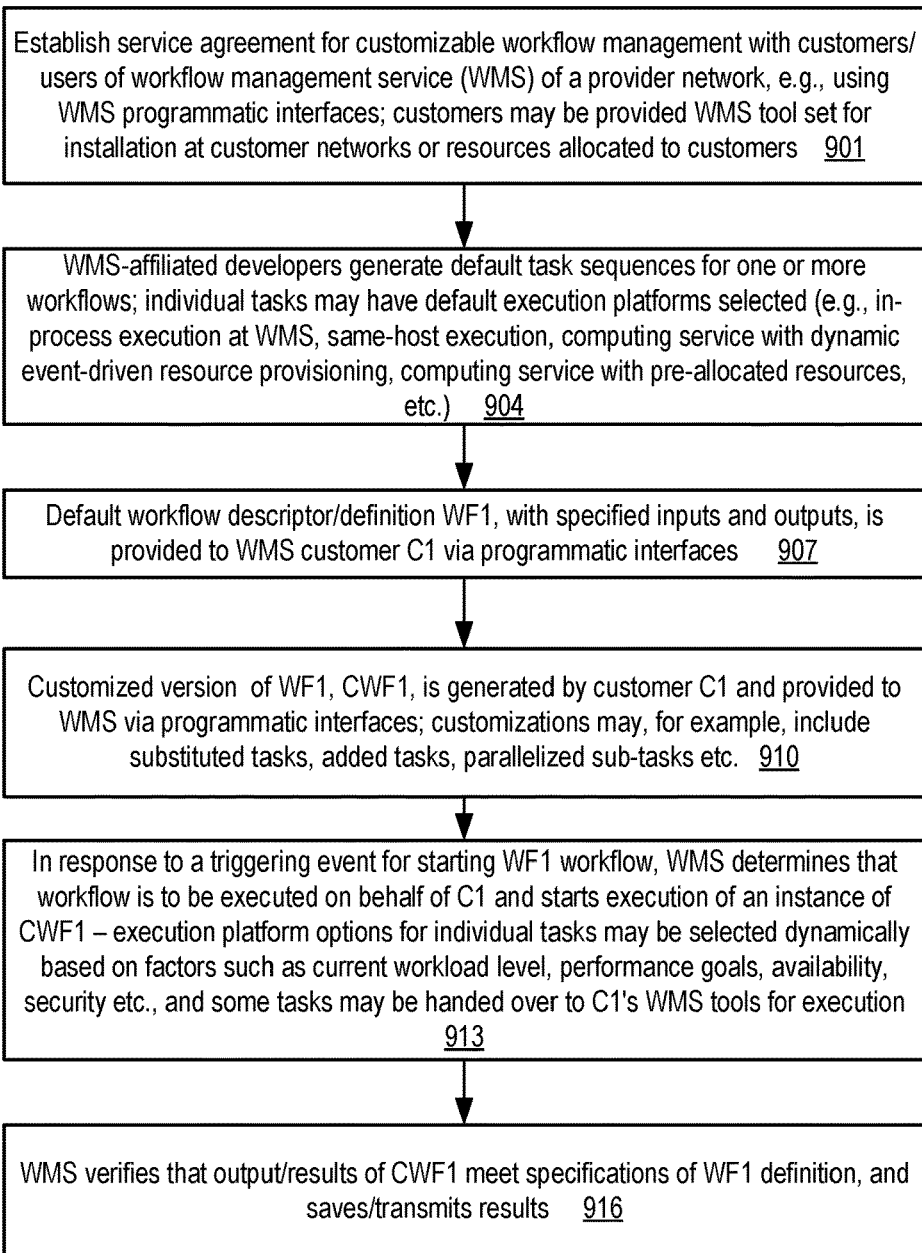
FIG. 9 is a flow diagram illustrating aspects of operations that may be performed to support customizable workflows for which execution platforms may be selected dynamically, according to at least some embodiments.

FIG. 9 is a flow diagram illustrating aspects of operations that may be performed to support customizable workflows for which execution platforms may be selected dynamically, according to at least some embodiments. As indicated in element 901, a service agreement for customizable workflow management with customers/users of a workflow management service (WMS) of a provider network may be established. In some embodiments, a set of programmatic interfaces of the WMS may be used to establish the service agreement. In at least one embodiment, after the agreement is set up, customers may be provided a WMS tool set for installation at customer networks, or at resources such as virtual or physical machines) allocated to the customers within the provider network. In at least some embodiments, the clients of the workflow management service implemented at a provider network may include organizational entities (such as various departments or divisions) of the provider network itself.

In some embodiments, developers affiliated with the WMS may generate default task sequences for one or more workflows (element 904). Each of the workflows may comprise one or more tasks, with the sequencing of the tasks (e.g., whether all the tasks are part of a sequential pipeline, or some tasks can run in parallel) being indicated in a corresponding default workflow definition or descriptor. Input and output artifacts (e.g., data sets, documents formatted according to a particular specification of the WMS, or objects) may be specified for individual tasks and/or for the workflow as a whole in various embodiments. In at least one embodiment, the inputs and outputs may have to be encrypted in accordance with an encryption algorithm of the WMS or an algorithm indicated in the service agreement. In some embodiments, individual tasks may have default execution platforms selected (e.g., in-process execution at the WMS, same-host execution, a computing service with dynamic event-driven resource provisioning, a computing service with pre-allocated resources, etc.).

A default workflow definition or descriptor WF1, with specified inputs and outputs, may be provided to a particular WMS customer or client C1 (element 907), e.g., via a WMS programmatic interface. In some embodiments, the client may submit a request for the definition, while in other embodiments default definitions accessible to the client (as determined by the service agreement) may be transmitted automatically to the client.

The client may decide to either use the default workflow, or to customize it, e.g., based on the clients' application or objectives in various embodiments. In the depicted embodiment, a customized version of WF1, CWF1, may be generated by the customer and provided to the WMS via programmatic interfaces (element 910). Any of a number of different modification may be performed by the client to the default workflow descriptor; such customizations may, for example, include substituted tasks, added tasks, parallelized sub-tasks etc. as discussed above.

In response to a triggering event for starting a WF1 workflow, such as a determination that a web-services request directed to an application has been received, or that a task of some other workflow instance has been completed, a workflow controller of the WMS may determine that a workflow instance is to be executed on behalf of C1 (element 913) in the depicted embodiment. An instance of CWF1 may then be started, based on the customization provide by C1. Execution platforms for individual tasks may be selected dynamically in at least some embodiments, e.g., based on factors such as current workload level, performance goals, availability, security etc., as discussed above. Some tasks may be handed over to C1's WMS tools for execution in one embodiment.

In at least some embodiments, regardless of the specific execution resources used for various tasks of the CWF1 instance, the workflow controller may be responsible for verifying that the output produced by the instance does not violate the specifications of the WF1 definition. After the WMS verifies that the output or results satisfy the specification (element 916), the results may be transmitted to one or more destinations and/or saved in a repository in various embodiments.

It is noted that in various embodiments, some of the operations shown in FIG. 9 may be implemented in a different order than that shown in the figure, or may be performed in parallel rather than sequentially. Additionally, some of the operations shown in FIG. 9 may not be required in one or more implementations.

Use Cases

The techniques described above, of supporting workflows that are customizable and extendable by clients of a workflow management service, may be useful in a variety of environments. Different consumers of network accessible services may have respective requirements with respect to processing speed, availability, security and the like with regard to at least some workflow tasks. Based on such diverse requirements, default workflows for common applications may be customized, e.g., by respective developer teams at individual customers of the workflow service, as long as the overall inputs and outputs of the default workflow definitions remain compliant with the workflow definitions. When a given workflow is to be executed on behalf of a given customer, the workflow management service may seamlessly select the customization preferred by that customer, and select execution resources for various workflow tasks based on the customizations. The workflow definitions may be automatically updated at the workflow management service as developers make modifications on behalf of the client, enabling new features to de deployed seamlessly. Individual developers may be allowed to focus on the logic of the tasks, without having to be concerned about the specific execution resources which are going to be used for the tasks.

Illustrative Computer System

Figure 10:
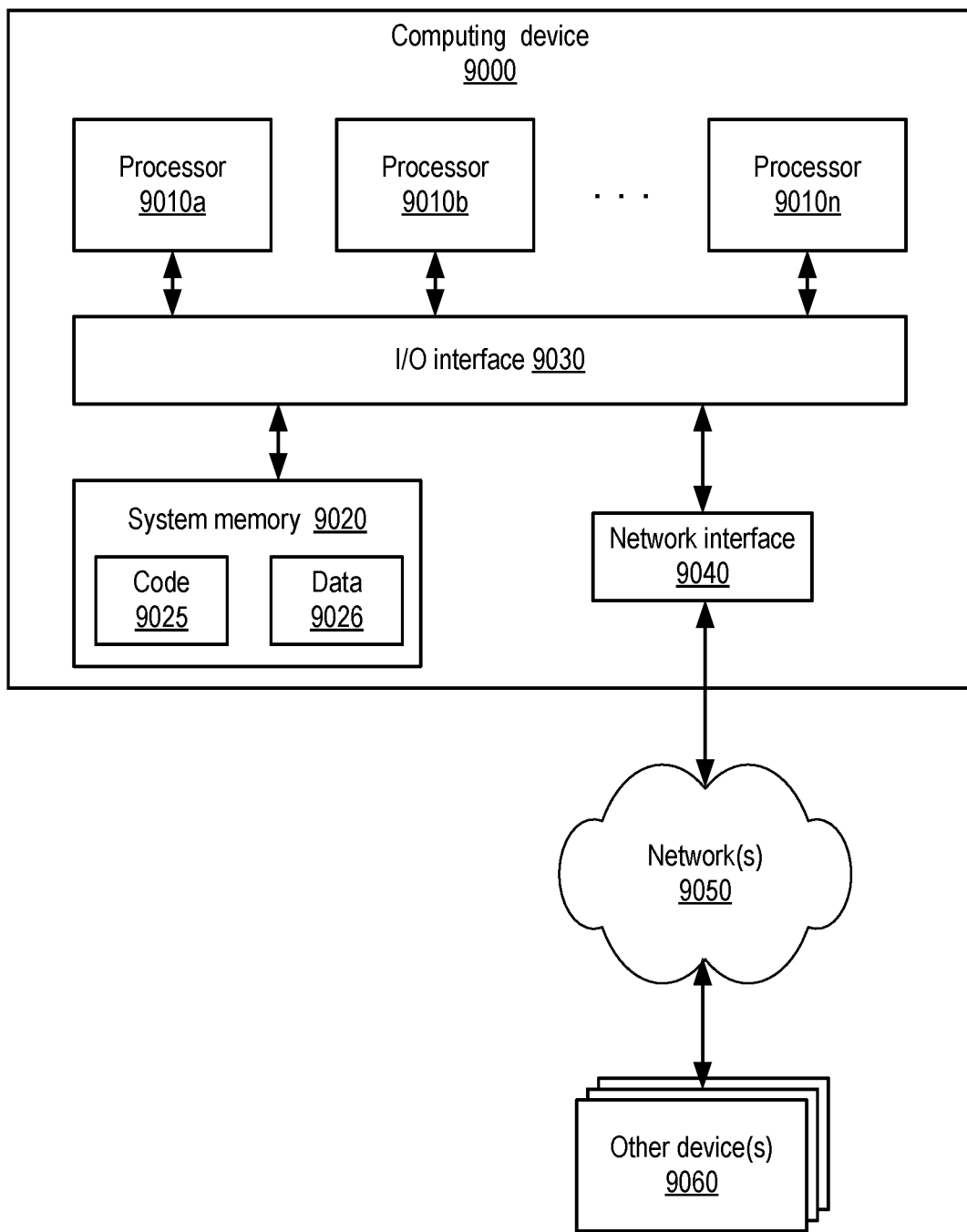
FIG. 10 is a block diagram illustrating an example computing device that may be used in at least some embodiments.

In at least some embodiments, a server that implements one or more of the techniques described above for developing, deploying and executing customizable workflows and associated tasks, including various elements of a workflow management service such as workflow controllers, artifact repositories, execution resources, and the like may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A computer-implemented method, comprising:
storing, at a workflow management service of a cloud computing environment, a plurality of versions of a first workflow, including a default version, a first customized version, and a second customized version, wherein the first customized version is stored in response to input from a first client of the workflow management service, and wherein the second customized version is stored in response to input from a second client of the workflow management service;
detecting, by the workflow management service, that a triggering event for launching a version of the first workflow has been generated by an event source, wherein the event source is one of a plurality of different event sources that can generate the triggering event; determining, by the workflow management service, a property of the event source, wherein the property is one of a plurality of different properties corresponding to different ones of the plurality of different event sources; and
causing, in response to said detecting and said determining, by the workflow management service, a particular version of the first workflow to be executed, wherein the particular version is selected from the plurality of versions by the workflow management service based at least in part on the property of the event source.

2. The computer-implemented method as recited in claim 1, wherein the property of the event source comprises an indication of a particular network within which the event source is configured.

3. The computer-implemented method as recited in claim 1, wherein the first customized version indicates a first set of execution resource options for the first workflow, and wherein the second customized version indicates a second set of execution resource options for the first workflow, wherein at least one execution resource option of the first set of execution resource options is not included in the second set of execution resource options.

4. The computer-implemented method as recited in claim 1, wherein the first customized version indicates a first network-accessible endpoint from which a first deployment artifact is to be obtained for executing a portion of the first workflow, and wherein the second customized version does not indicate the first network-accessible endpoint.

5. The computer-implemented method as recited in claim 1, wherein the first customized version indicates a first set of tasks of the first workflow, wherein the second customized version indicates a second set of tasks of the first workflow, wherein at least one task of the first set of tasks is not included in the second set of tasks.

6. The computer-implemented method as recited in claim 1, further comprising:
providing, by the workflow management service to the first client, access to a tool for generating customized versions of the first workflow, wherein the first customized version is generated by the first client using the tool.

7. The computer-implemented method as recited in claim 1, further comprising:
selecting, by the workflow management service, a resource for implementation of a particular task of the particular version of the first workflow based at least in part on one or more of: (a) a workload level, (b) a performance objective, (c) an availability objective, (d) a security objective, (e) a law, or (f) a client preference.

8. A system, comprising:
one or more computing devices;
wherein the one or more computing devices include instructions that upon execution on or across the one or more computing devices:
store, at a workflow management service of a cloud computing environment, a plurality of versions of a first workflow, including a default version, a first customized version, and a second customized version, wherein the first customized version is stored in response to input from a first client of the workflow management service, and wherein the second customized version is stored in response to input from a second client of the workflow management service;
detect, by the workflow management service, that a triggering event for launching a version of the first workflow has been generated by an event source, wherein the event source is one of a plurality of different event sources that can generate the triggering event; determine, by the workflow management service, a property of the event source, wherein the property is one of a plurality of different properties corresponding to different ones of the plurality of different event sources; and
cause, in response to the detection of the triggering event and the determination of the property of the event source, by the workflow management service, a particular version of the first workflow to be executed, wherein the particular version is selected from the plurality of versions by the workflow management service based at least in part on the property of the event source.

9. The system as recited in claim 8, wherein the property of the event source comprises an indication of a particular network within which the event source is configured.

10. The system as recited in claim 8, wherein the first customized version indicates a first set of execution resource options for the first workflow, and wherein the second customized version indicates a second set of execution resource options for the first workflow, wherein at least one execution resource option of the first set of execution resource options is not included in the second set of execution resource options.

11. The system as recited in claim 8, wherein the first customized version indicates a first network-accessible endpoint from which a first deployment artifact is to be obtained for executing a portion of the first workflow, and wherein the second customized version does not indicate the first network-accessible endpoint.

12. The system as recited in claim 8, wherein the first customized version indicates a first set of tasks of the first workflow, wherein the second customized version indicates a second set of tasks of the first workflow, wherein at least one task of the first set of tasks is not included in the second set of tasks.

13. The system as recited in claim 8, wherein the one or more computing devices include further instructions that upon execution on or across the one or more computing devices:
provide, by the workflow management service to the first client, access to a tool for generating customized versions of the first workflow, wherein the first customized version is generated by the first client using the tool.

14. The system as recited in claim 8, wherein the one or more computing devices include further instructions that upon execution on or across the one or more computing devices:
select, by the workflow management service, a resource for implementation of a particular task of the particular version of the first workflow based at least in part on one or more of: (a) a workload level, (b) a performance objective, (c) an availability objective, (d) a security objective, (e) a law, or (f) a client preference.

15. One or more non-transitory computer-accessible storage media storing program instructions that when executed on or across one or more processors:
store, at a workflow management service of a cloud computing environment, a plurality of versions of a first workflow, including a default version, a first customized version, and a second customized version, wherein the first customized version is stored in response to input from a first client of the workflow management service, and wherein the second customized version is stored in response to input from a second client of the workflow management service;
detect, by the workflow management service, that a triggering event for launching a version of the first workflow has been generated by an event source, wherein the event source is one of a plurality of different event sources that can generate the triggering event; determine, by the workflow management service, a property of the event source, wherein the property is one of a plurality of different properties corresponding to different ones of the plurality of different event sources; and cause, in response to the detection of the triggering event and the determination of the property of the event source, by the workflow management service, a particular version of the first workflow to be executed, wherein the particular version is selected from the plurality of versions by the workflow management service based at least in part on the property of the event source.

16. The one or more non-transitory computer-accessible storage media as recited in claim 15, wherein the property of the event source comprises an indication of a particular network within which the event source is configured.

17. The one or more non-transitory computer-accessible storage media as recited in claim 15, wherein the first customized version indicates a first set of execution resource options for the first workflow, and wherein the second customized version indicates a second set of execution resource options for the first workflow, wherein at least one execution resource option of the first set of execution resource options is not included in the second set of execution resource options.

18. The one or more non-transitory computer-accessible storage media as recited in claim 15, wherein the first customized version indicates a first network-accessible endpoint from which a first deployment artifact is to be obtained for executing a portion of the first workflow, and wherein the second customized version does not indicate the first network-accessible endpoint.

19. The one or more non-transitory computer-accessible storage media as recited in claim 15, wherein the first customized version indicates a first set of tasks of the first workflow, wherein the second customized version indicates a second set of tasks of the first workflow, wherein at least one task of the first set of tasks is not included in the second set of tasks.

20. The one or more non-transitory computer-accessible storage media as recited in claim 15, storing further program instructions that when executed on or across the one or more processors:

select, by the workflow management service, a resource for implementation of a particular task of the particular version of the first workflow based at least in part on one or more of: (a) a workload level, (b) a performance objective, (c) an availability objective, (d) a security objective, (e) a law, or (f) a client preference.

* * * * *